United States Patent [19]

Miki

[11] Patent Number: 4,572,338
[45] Date of Patent: Feb. 25, 1986

[54] LOCK-UP CLUTCH SYSTEM FOR VEHICULAR AUTOMATIC TRANSMISSION

[75] Inventor: Nobuaki Miki, Kariya, Japan

[73] Assignee: Aisin-Warner Kabushiki Kaisha, Anjo, Japan

[21] Appl. No.: 674,702

[22] Filed: Nov. 21, 1984

Related U.S. Application Data

[63] Continuation of Ser. No. 374,698, May 4, 1982.

[51] Int. Cl.$^4$ ............................................. B60K 41/22
[52] U.S. Cl. .................................... 192/3.29; 192/3.57
[58] Field of Search .................. 192/0.076, 3.28, 3.29, 192/3.3, 3.31, 3.32, 3.33, 103 R, 3.57, 3.58; 74/867, 868

[56] References Cited

U.S. PATENT DOCUMENTS

| | | | |
|---|---|---|---|
| 3,252,352 | 5/1966 | General et al. | 192/3.29 |
| 3,693,478 | 9/1972 | Malloy | 192/3.31 |
| 4,367,812 | 1/1983 | Kobayashi et al. | 192/3.3 |
| 4,428,467 | 1/1984 | Hiramatsu | 192/3.31 |
| 4,431,095 | 2/1984 | Suga | 192/3.31 |

FOREIGN PATENT DOCUMENTS 0064148 11/1982 European Pat. Off. ........... 192/3.29

*Primary Examiner*—George H. Krizmanich
*Attorney, Agent, or Firm*—Cooper, Dunham, Clark, Griffin & Moran

[57] ABSTRACT

In a hydraulic control system for automatic transmissions of motor vehicles, a lock-up control circuit for controlling a direct-coupling clutch of a torque converter, the lock-up control circuit comprising: a lock-up control valve having a spring-biased valve spool and operated by solenoid pressure applied to a spring-loaded end of the valve spool and oil pressure applied to the other end of the spool upon shift to a predetermined gear position and in higher gear positions, connecting an oil pressure source with either a clutch engaging conduit or a clutch releasing conduit of the direct-coupling clutch of the torque converter; with ON-OFF operation of solenoid valve; and a solenoid valve provided in an oil conduit communicating with the spring-loaded end of the spool and adapted to produce the solenoid pressure in a gear position lower than said predetermined lock-up gear position.

1 Claim, 3 Drawing Figures

LOCK-UP CLUTCH SYSTEM FOR VEHICULAR AUTOMATIC TRANSMISSION

This is a continuation of application Ser. No. 374,698 filed May 4, 1982.

BACKGROUND OF THE INVENTION

1. Field of the Invention

This invention relates to a system for controlling a direct-coupling clutch of a torque converter of an electrically controlled automatic transmission.

2. Description of the Prior Art

It is known in the art to lock up a torque converter upon upshift to 2nd, 3rd or other predetermined gear positions by supplying an operating oil pressure (line pressure) to a direct-coupling clutch control circuit through a shift valve as soon as the predetermined gear position is reached, cutting off the supply of the oil pressure to the direct-coupling clutch control circuit in lower gear positions. As illustrated in FIG. 1, in a direct-coupling clutch control for an electrically controlled automatic transmission, the line pressure which is supplied to a conduit 1130 in the lock-up gear position is drawn through an orifice 4220 into a conduit 1140 with a solenoid valve 4200. The solenoid pressure which is controlled by the solenoid valve 4200 is applied to a spool 2920 of a lock-up control valve 2900 at one end loaded with a biasing spring 2910, against the line pressure in the conduit 113 acting on the other end of the spool 2920, to connect either a clutch engaging conduit 1220 or releasing conduit 1210 of a direct-coupling clutch 500 of a torque converter with a conduit 1200 which is in communication with an oil pressure source, thereby engaging or releasing the direct coupling clutch 500. When the oil pressure is supplied to the direct-coupling control circuit upon an upshift to a lock-up gear position, it is often experienced that the lock-up control valve 2900 is actuated to lock up the torque converter irrespective of the ON- or OFF-state of the solenoid valve 4200 due to a time delay which is caused by differences in the length or resistance of the oil conduits. Especially in a case where an orifice is provided in the conduit 1130 in order to generate a solenoid pressure by controlling the line pressure by a solenoid valve 4200 as shown in FIG. 1, there occurs a delay in the supply of the oil pressure to the conduit 1140. For example, in a case where the line pressure is supplied to the conduit 1130 through a 1-2 shift valve when the latter is shifted to 2nd position to lock up the torque converter in 2nd and higher gear positions, the spool 2920 of the lock-up control valve 2900 is shifted to the upper position in FIG. 1 as soon as the line pressure is admitted into conduit 1130 upon upshift to 2nd even if the solenoid valve 4200 is in OFF-state, causing a premature lock-up of the torque converter (without control by the solenoid valve 4200) which may lead to an engine stall or other dangerous accidents.

SUMMARY OF THE INVENTION

It is an object of the present invention to provide a direct-coupling clutch control system which will overcome the above-mentioned problem of the conventional counterparts.

It is a more particular object of the present invention to provide a system for controlling a direct-coupling clutch of a torque converter of an electrically controlled automatic transmission, in which a lock-control valve is controlled solely by a solenoid valve in a reliable manner to preclude inadvertent lock-up of the torque converter.

More specifically, in a hydraulic control system for automatic transmissions of motor vehicles, the present invention provides a lock-up control circuit which comprises: a lock-up control valve having a spring-biased valve spool and operated by a solenoid pressure applied to a spring-loaded end of the valve spool and controlled by a solenoid valve and an oil pressure applied to the other end of the valve spool upon shift to a predetermined gear position and in higher gear positions, connecting an oil pressure source with either a clutch engaging conduit or a clutch releasing conduit of the direct-coupling clutch of the torque converter in relation with ON-OFF operation of the solenoid valve. One feature of the lock-up control circuit of the present invention resides in that the solenoid pressure is generated in a gear position lower than a predetermined gear position at which the torque converter is to be locked up.

The above and other objects, features and advantages of the present invention will become apparent from the following description and appended claims, taken in conjunction with the accompanying drawings which illustrate by way of example a preferred embodiment of the present invention.

BRIEF DESCRIPTION OF THE DRAWINGS

In the accompanying drawings.

DETAILED DESCRIPTION OF THE INVENTION AND PREFERRED EMBODIMENT

Figure 1:
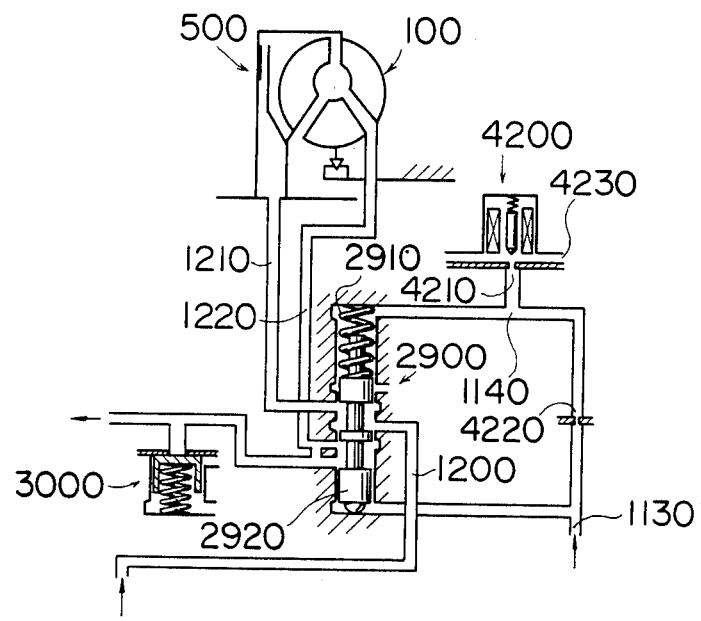
FIG. 1 is a schematic view of a conventional direct-drive clutch control system for a torque converter of an automatic transmission.
Figure 2:
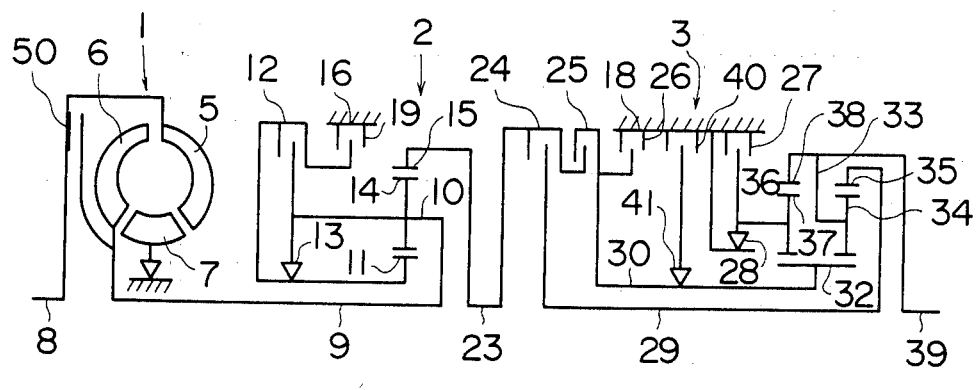
FIG. 2 is a skeletal view of an automatic transmission with a torque converter which is provided with a direct-drive clutch.
Figure 3:
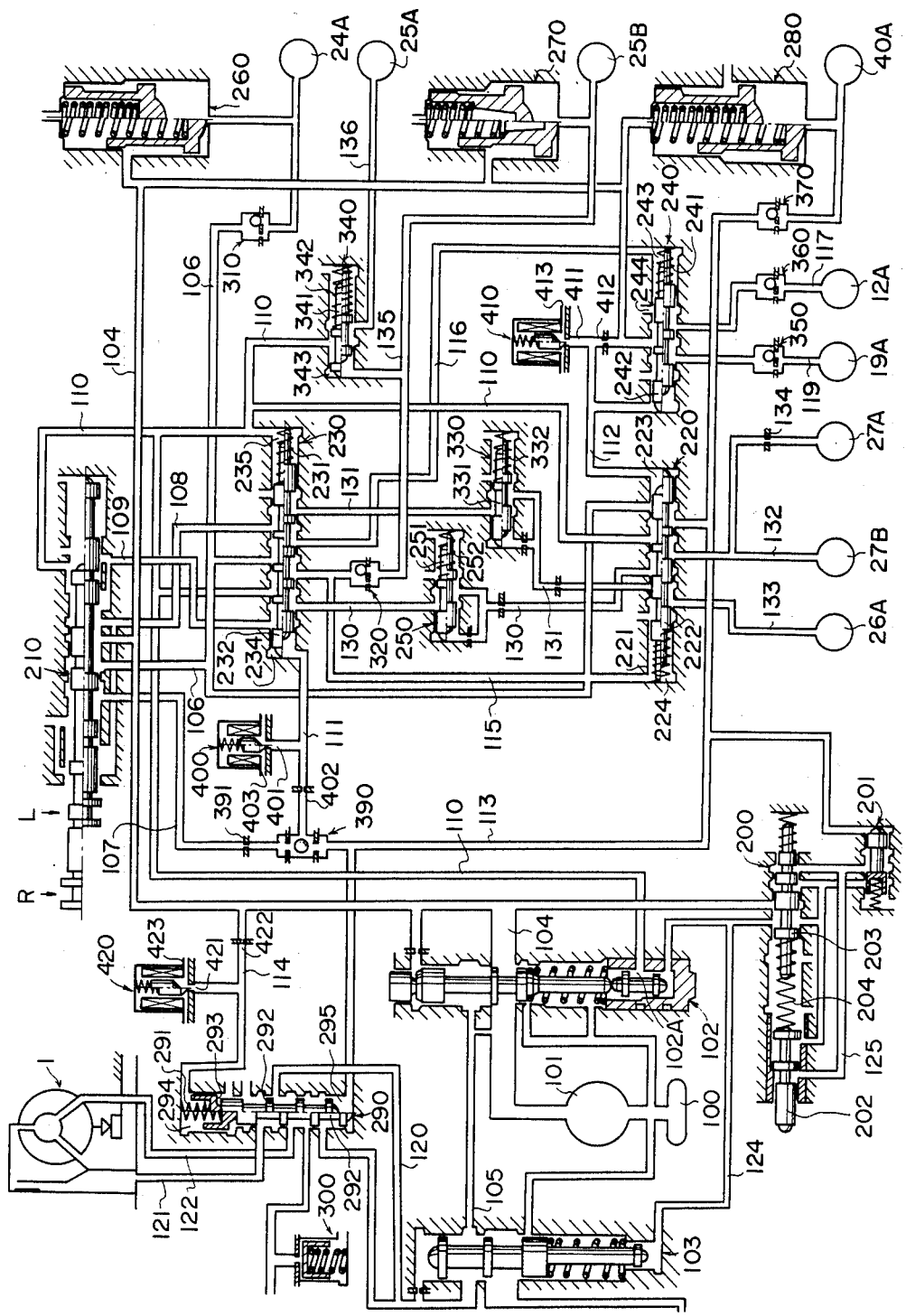
FIG. 3 is a circuit diagram of a hydraulic control system for an automatic transmission, incorporating a direct-drive clutch control circuit according to the present invention.

Referring to FIG. 2, there is schematically shown an example of a fluid-coupling type 4-speed automatic transmission includes a torque converter 1, an overdrive mechanism 2 for establishing 4th speed, and a planetary gear transmission system 3 for establishing three forward speeds and one reverse positions, under control of a hydraulic control system as shown in FIG. 3. The torque converter 1 is of conventional construction and includes a pump 5, a turbine 6 and a stator 7, with the pump 5 coupled with an engine crank shaft 8. The torque converter 1 is provided with a direct-drive clutch 50 for mechanically coupling a turbine shaft 9 with the engine crank shaft 8 without intervention of a fluid. The turbine shaft 9 which constitutes the output shaft of the torque converter 1 and at the same time the input shaft of the overdrive mechanism 2 is coupled with a carrier 10 of an overdrive planetary gear system. Planetary pinions 14 rotatably supported by the carrier 10 are meshed with a sun gear 11 and a ring gear 15. The sun gear 11 and carrier 10 are connectible through friction elements, namely, through a multiple disc clutch 12 and a one-way clutch 13, while the sun gear 11 and an overdrive case 16 housing the overdrive mechanism are also connectible through friction elements, namely, a multiple disc brake 19.

The ring gear 15 of the overdrive mechanism 2 is coupled with an input shaft 23 of a planetary transmission gear system with three forward and one reverse positions. A multiple disc clutch 24 is provided between the input shaft 23 and an intermediate shaft 29, while another multiple disc clutch 25 is provided between the input shaft 23 and a sun gear shaft 30. The sun gear shaft 30 is engageable with the transmission case 18 through a multiple disc brake 26 or through a multiple disc brake 40 via one-way clutch 41. A sun gear 32 which is mounted on the sun gear shaft 30 constitutes a couple of parallel planetary set together with a carrier 33, a planetary pinion 34 supported by the carrier 33, a ring gear 35 meshed with the pinions 34, a second carrier 36, planetary pinions 37 supported by the second carrier 36, and a ring gear 38 meshed with the pinions 37. The ring gear 35 in one of the planetary gear set is coupled with the intermediate shaft 29, and the carrier 33 of the same planetary gear set is connected to the ring gear 38 of the other planetary gear set. The just-mentioned carrier 33 and ring gear 38 are connected to the output shaft 39 of the transmission. A multiple disc brake 27 and a one-way clutch 28 are provided between the carrier 36 of the outer planetary gear system and the transmission case 18.

The above-described fluid-coupling type automatic transmission with an overdrive mechanism is controlled by a hydraulic control system which engages or releases the respective brakes and clutches according to the engine output and vehicle speed as will be described in greater detail hereinafter to permit automatic shifts to and from four forward speed positions and a manual shift to and from a reverse position.

Table 1 below shows the various transmission gear positions in relation with the engaging and releasing operations of the respective clutches and brakes.

control valve 293 which constitutes the direct-coupling control of the present invention along with a solenoid valve 420 and an orifice 422 which will be described in greater detail hereinlater, a by-pass valve 300, flow control valves 310, 320, 350, 360 and 370 each with a check valve, a three-way check valve 390, a first solenoid valve 400 for controlling the 2-3 shift valve, a second solenoid valve 410 for controlling both 1-2 and 3-4 shift valves, a third solenoid valve 293 for producing a solenoid pressure to be applied to the spool of the lock-up control valve 420 by controlling the line pressure supplied through the orifice 422, and conduits communicating the respective valves with hydraulic servos of the clutches and brakes including 12A, 19A, 24A, 25A, 25B, 26A, 27A, 27B and 40A.

The operating oil taken from the oil reservoir 100 by the oil pump 101 is regulated into a predetermined pressure level (line pressure) by the pressure regulator valve 102 for supply to conduit 104. The excess oil from the pressure regulator valve 102 is fed through conduit 105 to the second pressure regulator valve 103 where it is regulated into a predetermined torque converter pressure, a lubricant oil pressure and a cooler pressure according to the throttle pressure of the throttle valve 200. The speed selector valve (manual valve) 210 which is in communication with the conduit 104 is connected to the shift lever so that it is shifted to the positions of P (parking), R (reverse), N (neutral), D (drive), 3 (third) and L (low) according to the range selected by the shift lever. Table 2 below shows communication of conduits 106 to 110 with conduit 104 in relation with the shift lever positions.

TABLE 2

|  | P | R | N | D | 3 | L |
|---|---|---|---|---|---|---|
| Conduit 106 | x | x | x | o | o | o |

TABLE 1

| Shift positions | | Friction elements | | | | | | | | | |
|---|---|---|---|---|---|---|---|---|---|---|---|
| | | Clutch 12 | Clutch 24 | Clutch 25 | Brake 19 | Brake 26 | Brake 27 | Brake 40 | 1-way clutch 13 | 1-way clutch 28 | 1-way clutch 41 |
| Parking (P) | | x | x | x | o | x | x | x | — | — | — |
| Reverse (R) | | o | x | o | x | x | o | x | Lock | O'run | O'run |
| Neutral (N) | | x | x | x | o | x | x | o | — | — | — |
| Forward D-range | 1st | o | o | x | x | x | x | x | Lock | Lock | O'run |
| | 2nd | o | o | x | x | x | x | o | Lock | O'run | Lock |
| | 3rd | o | o | o | o | x | x | o | Lock | O'run | O'run |
| | OD | x | o | o | o | x | x | o | O'run | O'run | O'run |
| 3-range | 1st | o | o | x | x | x | x | x | Lock | Lock | O'run |
| | 2nd | o | o | x | x | o | x | o | Lock | O'run | Lock |
| | 3rd | o | o | o | x | x | x | o | Lock | O'run | O'run |
| L-range | 1st | o | o | x | x | x | o | x | Lock | Lock | O'run |
| | 2nd | o | o | x | x | o | x | o | Lock | O'run | Lock |
| | 3rd | o | o | o | x | x | x | o | Lock | O'run | O'run |

The symbols "o" and "x" indicate the engaged and released states of the clutches and brakes, respectively.

Now, a preferred embodiment of the invention is described in relation with a hydraulic control system shown in FIG. 3, which selectively operates the above-mentioned friction coupling elements, viz., the clutches and brakes 12, 19, 24, 25, 26, 27 and 40, in automatic or manual shift operation of the transmission.

The hydraulic control system includes an oil reservoir 100, an oil pump 101, a pressure regulator valve 102, a second pressure regulator valve 103, a throttle valve 200, a cut-back valve 201, a manual valve 210, a 1-2 shift valve 220, a 2-3 shift valve 230, a 3-4 shift valve 240, a low coast modulator valve 330, a reverse clutch sequence valve 340, an accumulator 260 for smoothing the engagement of the clutch 25, a lock-up

| Conduit 107 | x | x | x | o | o | x |
| Conduit 108 | x | x | x | x | o | o |
| Conduit 109 | x | o | x | x | x | o |
| Conduit 110 | x | o | x | x | x | x |

The first solenoid valve 400 which controls the 2-3 shift valve 230 closes its valve port 401 when in de-energized state to produce oil pressure in conduit 107 through orifice 402 and in conduit 107 through three-way check valve 390, opening the valve port 401 upon energization to drain the oil pressure in conduit 111 through a drain port 403. The second solenoid valve 410 which controls the 1-2 shift valve 220 and 3-4 shift valve 240 closes its valve port 411 when in de-energized stage to produce the line pressure in conduit 112 which is in communication with conduit 104 through orifice 412, and, when in energized stage, opens the valve port 411 to drain the oil pressure in conduit 112 through a drain port 413. The third solenoid valve 420 which controls the lock-up control valve 290 closes its valve port 412 when in de-energized stage to produce high solenoid pressure in conduit 114 which is in communication with conduit 104 through 422, opening the valve port 421 upon energization to drain the oil pressure in conduit 114 through a drain port 423 for dropping the solenoid pressure. Table 3 below shows the energized and de-energized states of the solenoid valves 400 and 410 in relation with the gear positions of the automatic transmission, in which the symbol "o" indicates an energized state, the symbol "x" a de-energized state and the symbol "Δ" either an energized or de-energized state of the solenoid valves which are controlled by an electric control circuit according to the vehicle speed, throttle opening and shift lever position.

TABLE 3

| Shift position | P | R | N | D | | | | 3 | | | L | | |
|---|---|---|---|---|---|---|---|---|---|---|---|---|---|
| Gear position | | | | 1 | 2 | 3 | 4 | 1 | 2 | 3 | 1 | 2 | 3 |
| Solenoid valve 400 | x | x | x | o | o | x | x | o | o | x | Δ | o | x |
| Solenoid valve 410 | x | o | x | x | o | o | x | x | o | Δ | x | o | o |

The 1-2 shift valve 220 is provided with a spool 222 with a biasing spring 221 at one end thereof and, in first speed with the solenoid valve 410 in de-energized stage, the spool 222 is held in the left position in FIG. 3 by the oil pressure which is produced in conduit 112 and supplied to the right oil chamber 223. In second speed, the solenoid valve 410 is energized to drain the oil pressure in conduit 112, so that the spool 222 is displaced to and held in right-hand position in the same figure. In third and fourth speeds, the spool 232 of the 2-3 shift valve which will be described hereinafter is held in the right position to supply oil pressure through conduit 115 to the left oil chamber 224 of the 1-2 shift valve 220, fixing the spool 222 in the right position of the drawing.

The 2-3 shift valve 230 is provided with a spool 232 with a biasing spring 231 at one end thereof. In a case where oil pressure is supplied to conduit 111 which is provided with the first solenoid valve 400 and which is in communication with the oil chamber 234 at the other end of the 2-3 shift valve 230, the spool 232 is held in the left position by the action of the spring 231 in first and second speeds since the solenoid 400 is in energized state with no oil pressure in conduit 111. In third and fourth speeds with the solenoid in de-energized state, the spool 232 is displaced to the right position by the oil pressure appearing in conduit 111.

The 3-4 shift valve 240 is provided with a spool 242 with a biasing spring 241 at one end thereof, the spool 242 being fixed in the left position in FIG. 3 in first and second speeds by the oil pressure which is admitted into the oil chamber 243 through conduit 116. Conduit 116 is drained in third and fourth speeds and the solenoid valve 410 is energized in third speed to drain conduit 112, so that the spool 242 is displaced and held in the left position in the same figure by the action of the spring 241, but in fourth speed with the solenoid valve 410 in de-energized state, the spool is held in the right position by the oil pressure which occurs in conduit 112.

When the speed selector valve 210 is shifted to D- or 3-range position, the three-way check valve 390 constantly supplies the oil pressure in conduit 107 to conduit 111, and when the selector valve 210 is in L-range position, it supplies oil pressure to conduit 111 through conduit 106, 1-2 shift valve 220 and conduit 113 as long as the spool 222 of the 1-2 shift valve is in the right position (second-speed position) in illustration. Therefore, when the speed selector valve 210 is in the L-position, it is possible to control the 2-3 shift valve 230 by the first solenoid valve 400 to effect gear shifts to three forward speeds in L-range. In the event the three-way check valve 390 fail to function properly due to frictional wear of the check ball or for other reasons, the orifice 391 limits the drain through conduit 107 and speed selector valve 210 of the oil pressure which is supplied from conduit 113 when the speed selector valve 210 is shifted to the L-range position, thereby ensuring the production of oil pressure in conduit 111 controlled by the first solenoid valve 400 to guarantee a secure gear shift to third speed.

The throttle valve 200 has an indicator valve 202 which is stroked according to the extent of the accelerator pedal depression, thereby compressing a spring 204 interposed between the indicator valve 202 and a valve spool 203 to produce a throttle pressure in conduit 124.

The throttle pressure in conduit 124 is led to conduit 125 by the cut-back valve 201 when the oil pressure prevails in conduit 113 (in second, third and fourth speeds) to reduce the throttle pressure for the purpose of precluding unnecessary pump losses.

The lock-up control valve 290 is provided with spools 292 and 293 which are biased by spring 291 at one end thereof, and receives the line pressure into one oil chamber 294 from conduit 104 through orifice 422 and conduit 114. The line pressure is also supplied to the other oil chamber 295 at the opposite end in second, third and fourth speeds from conduit 106 through the 1-2 shift valve 220 and conduit 113. Therefore, it can be controlled by the solenoid valve 420 in second, third and fourth speed but not in other gear positions. This serves to preclude operational troubles like engine stalls which are caused by faulty actions of the lock-up clutch in starting operation or the like.

When the speed selector valve 210 is shifted to the D-range position, conduit 104 is communicated with conduits 106 and 107 to admit the oil pressure of conduit 107 into conduit 111 through the three-way check valve 390.

In first speed position with the solenoid valves 400 and 410 respectively in energized and de-energized states, the oil pressure in conduit 107 is fed to the three-way check valve 390 which has its lower inlet port closed by the ball as conduit 113 is drained through 1-2 shift valve 220, conduit 110 and manual valve 210. Consequently, the oil pressure in conduit 107 is admitted into the oil chamber 234 of the 2-3 shift valve 230 through orifice 402 and conduit 111. The spool 222 of the 1-2 shift valve 220 is therefore held in the left position of illustration by the oil pressure prevailing in the oil chamber 223, the spool 232 of the 2-3 shift valve 230 in held in the left position by the action of the spring 231, and the spool 242 of the 3-4 shift valve 240 is retained in the left position by the oil pressure prevailing in the oil chamber 243 and the action of spring 241. The oil pressure in conduit 106 is fed to the hydraulic servo 24A while the oil pressure in conduit 104 is fed to the hydraulic servo 12A through 3-4 shift valve 240 and conduit 104, respectively engaging the clutches 24 and 12.

In second speed with the solenoid valve 410 in energized state, the spool 222 of the 1-2 shift valve 220 is displaced to the right position of illustration. The oil pressure in conduit 106 is therefore fed to conduit 113 through the 1-2 shift valve 220, so that the three-way check valve receives the oil pressure from the upper and lower conduits 107 and 113 with its ball in neutral position to supply the oil pressure from conduit 107 or 113 to conduit 111. The oil pressure in conduit 106 is fed to the hydraulic servo 40A through 1-2 shift valve 220, conduit 113 and check valve 370, engaging the brake 40 to establish second speed.

The solenoid valve 400 is de-energized in third speed so that the spool 232 of the 2-3 shift valve is displaced to the right position of illustration. The oil pressure in conduit 106 is fed to the hydraulic servo 25B through the 2-3 shift valve 230, check valve 320 and conduit 135 to engage the clutch 25, while the oil pressure in conduit 106 is fed to the left oil chamber 224 of the 1-2 shift valve 220 through the 2-3 shift valve 230 and conduit 115, fixing the spool 222 in the right position by the oil pressure and the force of the spring 221. Simultaneously, the oil pressure in the oil chamber 243 which has been fixing the spool 242 of the 3-4 shift valve 240 is drained through conduit 116, 2-3 shift valve 230, conduit 10B and manual valve 210 to make the 3-4 shift valve 240 controllable by the solenoid valve 410.

In fourth speed, both of the solenoid valves 400 and 410 are in de-energized state, so that the spool 242 of the 3-4 shift valve 240 is displaced to the right position of illustration to communicate conduit 117 with drain port 244, draining the oil pressure in the hydraulic servo 12A, and instead communicate conduit 104 with conduit 119 to the hydraulic servo 19A, thereby releasing the clutch 12 and engaging the brake 19.

As clear from the foregoing description, in the D-range position, it is necessary to feed the oil pressure to conduit 111 through orifice 402 to permit control of the 2-3 shift valve 230 by the solenoid valve 400. In this connection, it is not necessarily required to jointly communicate conduits 113 and 107 with conduit 111 by the use of the three-way check valve 390, and conduit 107 may be directly connected to orifice 402 if desired.

In the present embodiment, the direct-drive clutch of the torque converter is locked up in second and higher gear positions. As described hereinbefore, the oil chamber 294 at the upper end of the lock-up control valve 290 in illustration 3 is constantly supplied with the line pressure which is fed from conduit 104 through orifice 422 as a solenoid pressure controlled by the solenoid valve 420, pushing the spools 292 and 293 together with the spring 291 downward in illustration. In second speed and higher gear positions, when the spool 222 of the 1-2 shift valve 220 is held in the left position (second-speed position), conduits 106 and 113 are communicated with each other to produce line pressure in conduit 113 and thus in the oil chamber 295 which is in communication with conduit 113, imposing upward pressure in the spools 292 and 293.

Gear in first speed

Since the line pressure is absent in conduit 113, the spools of the lock-up control valve 290 are held in the lower position by the actions of the solenoid pressure and the spring 291, communicating conduit 120 with releasing conduit 121 of the torque converter direct-coupling clutch 50 irrespective of ON- or OFF-state of the solenoid valve 420. Consequently, the lock-up does not take place.

Gear in second or higher speeds

As the solenoid pressure is at high level when the solenoid valve 420 is de-energized, the spool 292 of the lock-up control valve 290 is held in the lower position in illustration 3 by the actions of the high solenoid pressure and spring 291, communicating conduit 120 with direct-coupling clutch releasing conduit 121 to release the direct-coupling clutch 50. Upon energizing the solenoid valve 420, the solenoid pressure is turned to low level and the spool 292 of the lock-up control valve 290 is displaced to and held in the upper position in illustration by the action of the line pressure fed to the oil chamber 295, as a result communicating conduit 120 with clutch engaging conduit 122 to engage the direct-coupling clutch 50.

Gear shifted from first to second speed

The spool 222 of the 1-2 shift valve 220 is displaced to the second-speed position, simultaneously starting supply of oil pressure from conduit 113 to the oil chamber 295 of the lock-up control valve 290. At this time point, the solenoid pressure already occurs in the oil chamber 294 so that the spool is retained in the lower position in illustration until the solenoid valve is energized, without causing any inadvertent lock-up action.

When the speed selector valve 210 is shifted to the 3-range position, the three-way check valve 390 operates in the same manner as in the D-range position. Differences are found only in that the 2nd engine brake is applied by conduit 108, and the 3-4 shift valve is fixed in the third speed position to prohibit an upshift to overdrive (fourth speed). Conduit 104 is in communication with conduits 106, 107 and 108. In third speed, the oil pressure admitted into conduit 108 is fed to the oil chamber 243 of the 3-4 shift valve 240 through the 2-3 shift valve 230 and conduit 116 to fix the spool 242 in the left position in illustration. Therefore, even if the solenoid valves 400 and 410 take fourth-speed positions, there takes place no change in the position of the 3-4 shift valve 240, prohibiting upshift to fourth speed. In second speed, the oil pressure in conduit 108 is fed to the hydraulic servo 26A through 2-3 shift valve 230, conduit 131, intermediate coast modulator valve 330 and 1-2 shift valve 220, thereby engaging the brake 26 to produce the effect of the 2nd engine brake. The intermediate coast modulator valve 330 is constituted by a spool 331 and a spring 332, and serves to adjust the oil pressure for smoothing out the shocks which would occur upon application of the second engine brake. Namely, in the 3-range position, the gear is automatically shifted in three forward speed positions with engine brake in second speed.

When the speed selector valve is in the L-range position, conduit 107 which carries the oil pressure in the D- and 3-range positions is now drained and conveys no oil pressure to the three-way check valve 390. Since conduit 107 is in drained state, no oil pressure is supplied to conduit 111. Consequently, the spool 232 is held in the left position irrespective of the ON- and OFF-states of the solenoid valve. Namely, in first speed of L-range position, the 2-3 shift valve is uncontrollable by the solenoid valve 400. Conduit 104 is communicated with conduits 106, 108 and 109. Conduit 107 which is communicated in the D- and 3-range positions is drained. In this state, gear is shifted in three forward speeds with engine brake. The oil pressure admitted into conduits 106 and 108 is fed to the respective hydraulic servos in the same manner as in the D- and 3-range positions. The low coast modulator valve 250 is constituted by a spool 251 and a spring 252, and serves to generate a modulator pressure in conduit 130 by regulating the oil pressure supplied to conduit 109 through the 2-3 shift valve 230.

In the first speed position, oil pressure in the oil chamber 234 of the 2-3 shift valve 230 is drained through conduit 111, orifice 403, three-way check valve 390, conduit 107 and speed selector valve 210, so that the spool 232 of the 2-3 shift valve is held in the left position in illustration by the action of the spring 231 no matter whether the solenoid valve 400 is in ON- or OFF-state. Under these circumstances, the oil pressure in conduit 106 is fed to the oil chamber 243 of the 3-4 shift valve 240 through conduit 116 to fix the spool 242 in the left position in the same manner as when the speed selector valve is in the 3-range position, while the oil pressure in conduit 108 is fed to the 2-3 shift valve 220 through conduit 131 and intermediate coast modulator valve 330. Further, the oil pressure in conduit 109 is fed to the hydraulic servo 27B through the 2-3 shift valve 230, conduit 130, low coast modulator valve 250, 1-2 shift valve 220 and conduit 132, and also to the hydraulic servo 27A through orifice 134. Upon application of the oil pressure to the hydraulic servos 27B and 27A, the brake 27 is engaged to establish the first speed position with engine brake.

In second speed, the oil pressure occurs in conduit 113 as the same manner as in the D-range position, so that the ball of the three-way check valve 390 closes the upper port and the oil pressure is fed to conduit 111 through orifice 401. Namely, the 2-3 shift valve 230 becomes controllable by the solenoid valve 400. The 1-2 shift valve 220 with its spool 222 in the right position communicates conduit 131 with conduit 133 to feed through conduit 133 the reduced modulator pressure, which is produced by the intermediate coast modulator valve 340 in conduit 131, to the hydraulic servo 26A to engage the brake 26. The engagement of the brake 26 establishes the second speed position with engine brake. The oil pressure which is fed to conduit 106 is supplied to conduit 113 through the 1-2 shift valve 220 and to conduit 111 through the three-way check valve 390, so that the spool 232 of the 2-3 shift valve becomes controllable by the ON-OFF operation of the solenoid valve 400 to effect automatic 2-3 shifts.

The gear shifts in the three forward speeds of the L-range position of the speed selector valve 210 are effected at higher points at compared with the variations in the gear shifts to first to third speeds in the D-range position in order to permit rapid acceleration and deceleration.

In third speed, the 2-3 shift valve 230 is controllable by the solenoid valve 400 as the line pressure is fed to conduit 113 continuedly from the second speed position, that is to say, the 3rd position is attained by de-energizing the solenoid valve 400. A difference from the 3-range is found in that the engine brake is applied when the gear is in the first speed position.

In the R-position, conduit 104 is communicated with conduits 109 and 110. The oil pressure in conduit 110 is fed to the oil chamber 102A of the pressure regulator valve 102 to increase the line pressure, and at the same time it is fed to the oil chamber 235 of the 2-3 shift valve 230 to fix the spool 232 in the left position in illustration in cooperation with the spring 231. As a result, the oil pressure in conduit 110 is led to the oil chamber 224 of the 1-2 shift valve 220 through the 2-3 shift valve 230 and conduit 115 to fix the spool 222 in the right position jointly with the action of the spring 221. Therefore, the oil pressure in conduit 110 is supplied to the hydraulic servo 27B through the 1-2 shift valve 220 and conduit 132, and oil pressure is also supplied to the hydraulic servo 27A through orifice 134. The oil pressure in conduit 115 is further fed to the hydraulic servo 25B through the flow control valve 320 with a check valve and conduit 135.

Since the solenoid valve 410 is in energized state, the spool 242 of the 3-4 shift valve 240 is held in the left position in illustration to communicate conduits 104 and 117 with each other, supplying the oil pressure in conduit 104 to the hydraulic servo 12A to engage the clutch 12.

On the other hand, the oil pressure in conduit 110 is fed to the hydraulic servo 25A of the clutch 25 through the reverse clutch sequence valve 330 and conduit 136, engaging the clutch 425 jointly with the oil pressure which is fed to the hydraulic servo 25B of the clutch 25 through the 2-3 shift valve 230 and conduit 135. The clutch 25 has a couple of hydraulic servos 25A and 25B. The oil pressure is supplied to the hydraulic servo 25B alone in forward third speed, and to both of the hydraulic servos 25A and 25B in the R-position with a greater torque capacity.

In N-R shift, the oil pressure in conduit 110 is initially supplied to both of the hydraulic servos 25A and 25B to engage the brake 27. The oil pressure is admitted into the oil chamber 235 of the 2-3 shift valve 230 to hold the spool 232 in the left position in illustration, gradually supplying the oil pressure in conduit 110 to the hydraulic servo 25B through the flow control valve 320 with a check valve, conduit 135 and accumulator 270. Conduit 135 is communicated with the reverse clutch sequence valve 330 to supply the oil pressure to the oil chamber 343 of the reverse clutch sequence valve 340. The reverse clutch sequence valve 340 is constituted by a spool 341 and a spring 232. As the oil pressure in the hydraulic servo 25B is elevated beyond a level which is required for engaging the clutch 25, the spool 341 is displaced to the right in illustration to communicate conduits 110 and 136 with each other, supplying the oil pressure to the other hydraulic servo 25A to secure the transmission torque capacity in the reverse operation.

Although there has been described an automatic transmission which is arranged to lock up the torque converter in second and higher speeds, the invention can be similarly applied to those case where the torque converter is put in direct drive in third speed or in the highest gear position to preclude the inadvertent lock-up actions at the time of upshift to third speed or the maximum gear position. What is important is that the solenoid pressure is produced in a gear position lower than the predetermined gear position in which the direct-drive clutch is to be engaged.

It will be appreciated from the foregoing description that the direct-coupling clutch control system according to the present invention is arranged to produce the solenoid pressure already in a lower gear position so that it can securely prevent an inadvertent lock-up action upon upshift to a gear position in which the torque converter is to be locked up.

We claim:

1. In a lock-up clutch system for vehicular automatic transmission including a lock-up control circuit for controlling a direct coupling clutch of a torque converter, said circuit comprising:
   - (a) a lock-up control valve (293) having a spool (292) which is movably provided between a lock-up position in which said direct coupling clutch is actuated and a release position in which said direct coupling clutch is deactuated;
   - (b) a spring disposed to always urge said spool (292) toward said release position;
   - (c) at least four oil passages each disposed to communicate with said lock-up control valve (293);
   - (d) first oil passage (114) constantly directing oil pressure in the direction in which said spool (292) moves toward said release position;
   - (e) second oil passage (113) directing oil pressure in the direction in which said spool (292) tends to move toward said lock-up position against the force of said spring in company with shifting gear into a speed position higher than predetermined gear position;
   - (f) third oil passage (120) selectively communicated with fourth and fifth oil passages (122), (121) in response to the movement of said spool (292) to occupy it at the release and lock-up positions;
   - (g) said first and second oil passages (114), (113) being individually arranged which inhibit to form a communication except for the position in which said lock-up valve occupies; and
   - (h) an electromagnetic solenoid valve (420) provided in said first oil passage to release the fluid oil thereof exterior upon energization so as to move said spool (292) from said release position to said lock-up position to communicate said third oil passage (120) with said fourth passage (122).

* * * * *